UNITED STATES PATENT OFFICE.

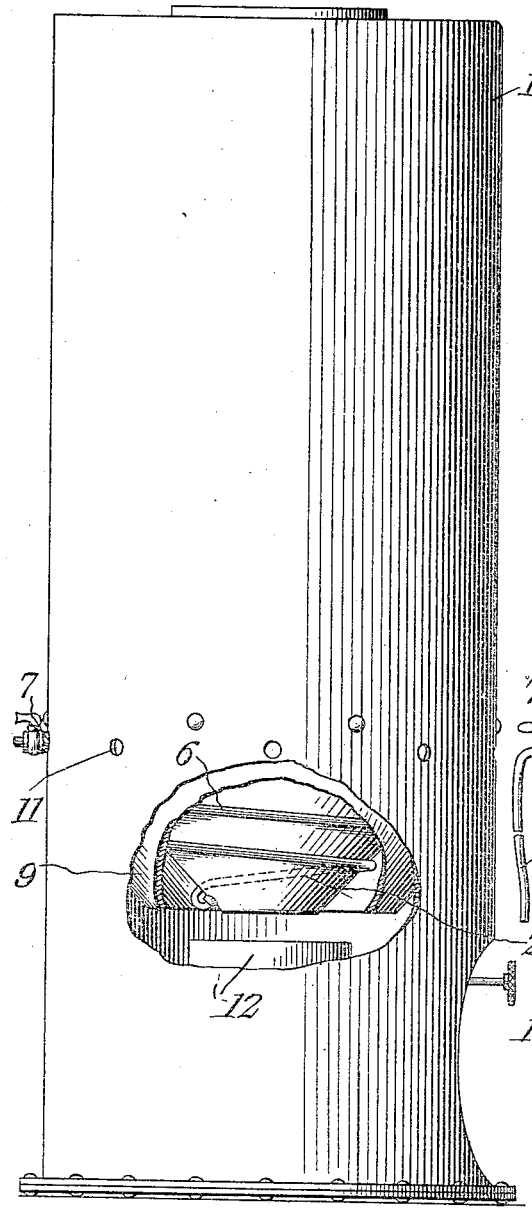
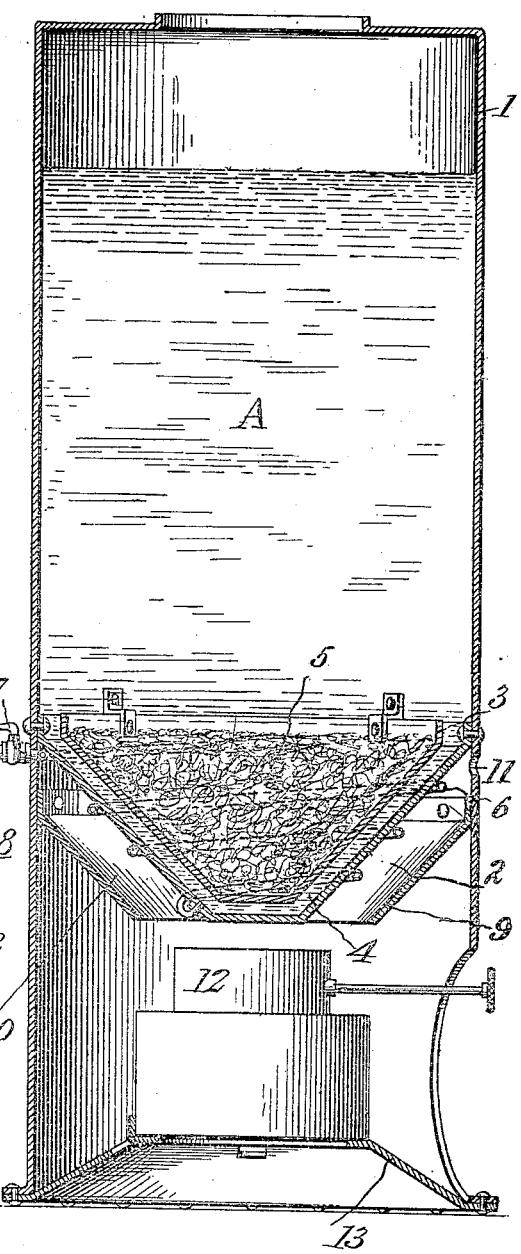

OSCAR P. CHURCHILL AND MAURICE E. RISK, OF SHAMROCK, TEXAS.

PORTABLE WATER-HEATER.

962,941.          Specification of Letters Patent.      Patented June 28, 1910.

Application filed January 14, 1910. Serial No. 538,093.

*To all whom it may concern:*

Be it known that we, OSCAR P. CHURCHILL and MAURICE E. RISK, citizens of the United States, residing at Shamrock, in the county of Wheeler and State of Texas, have invented new and useful Improvements in Portable Water-Heaters, of which the following is a specification.

The present invention provides means of a portable nature for heating small quantities of water such as may be desired for shaving, preparing warm beverages, or for bathing the hands and face, or for other desired purpose.

The invention contemplates a structure of novel formation designed chiefly for use in connection with an oil lamp, but which may be employed in connection with a burner or heater of any type, the device being of such formation as to insure the quick heating of the water and a continuous heating of the water as drawn from the storage receptacle.

The invention consists of the peculiar form of heater illustrated in the accompanying drawing, set forth in the following description, and more particularly claimed hereinafter.

Referring to the drawing, forming a part of the application, Figure 1 is a view in elevation of a heater embodying the invention, parts being broken away. Fig. 2 is a vertical central section thereof.

The device comprises a shell or casing 1, which may be of any construction and is usually of sheet metal. A conical shaped partition 2 is located near the lower end of the shell or casing 1 and constitutes the bottom of a receptacle, the latter being formed by said partition 2 and the part of the shell or casing above the same. A false bottom 3 of conical form is arranged within the receptacle a short distance above the partition 2, so as to leave a conical space 4 between the two parts 2 and 3 for the circulation of the water contained in the receptacle in a manner to insure its quick heating. The conical space 4 communicates at its upper end with the lower portion of the receptacle so as to receive the water therefrom. Refractory material 5, such as mineral wool, is supplied to the false bottom 3 in quantity to fill the same, thereby confining the heat to the conical space 4, whereby the water passing therethrough is quickly heated because of the small quantity coming in contact with the heated surface of the partition or bottom 2. A coil 6 of conical form encircles the conical bottom 2 and connects at its lower end therewith in a manner to communicate with the lower end of the conical space 4. The upper end of the conical coil 6 extends through the shell or casing 1, as indicated at 7, and a rubber tube 8 is connected thereto for carrying off the hot water to the desired point of use, particularly when the face, hands, or other part of the body is to be bathed. The projecting end 7 of the coil 6 is provided with a valve for regulating the outflow of the water when heated. A conical deflector 9 is arranged below the conical bottom 2 and is spaced therefrom a short distance and is secured at its outer edge to the shell or casing 1. A conical space 10 is formed between the bottom 2 of the receptacle and the deflector 9 for the passage of the hot air and products of combustion of the burner or other type of heater provided for use in connection with the device. Openings 11 are formed in the shell or casing opposite the upper end of the conical space 10 and form outlets for the hot air, gases and the like. A lamp 12 is shown as a convenient form of heater, but it is to be understood that a burner or portable heater of any type may be employed. A conical support 13 is provided for receiving the lamp 12 and is secured at its outer edge to the shell or casing 1.

The receptacle for receiving the water or other liquid to be heated is indicated by the reference letter A and the water to be heated is supplied thereto through an opening in the top. After the lamp 12 is lighted the heat resulting therefrom quickly raises the temperature of the water contained in the conical space 4, the water being further heated in the coil 6. Upon opening the valve in the extended end 7 of the coil to draw off the water that drawn off is replaced by the water contained in the receptacle, which flows into the space 4, thence upwardly through the coil 6 and outwardly through the extension 7 thereof and the tube 8. The mineral wool 5 retards the circulation of the water and by reason if its refractory nature prevents distribution of the heat by conduction, hence the heat is practically confined to a narrow zone and concentrated in its action on the thin layer of water passing through the narrow space 4 and to the thin stream of water passing through the coil 6.

It will be understood that the invention provides a device which is portable in nature and comparatively cheap in construction and which will quickly heat a small quantity of water, thereby adapting the same for the purpose of shaving or for preparing heated beverages or for any purpose that may require a small quantity of hot water only.

Having thus described the invention what is claimed as new, is:—

1. A device of the character specified for heating liquid, the same comprising a receptacle having a conical bottom, a false bottom of conical form arranged within the receptacle a short distance from the conical bottom thereof, refractory material filling said false bottom, a coil of conical form encircling the conical bottom of the receptacle and in communication at its lower end with the lower end of the conical space formed between said conical bottom and the false bottom, means for regulating the outflow of liquid from the upper end of said coil, and a heater located below the conical bottom.

2. A device of the character specified for heating liquid, the same comprising a receptacle having a conical bottom, a false bottom of conical form arranged within the receptacle a short distance from the conical bottom thereof, refractory material filling said false bottom, a coil of conical form encircling the conical bottom of the receptacle and in communication at its lower end with the lower end of the conical space formed between said conical bottom and the false bottom, means for regulating the outflow of liquid from the upper end of said coil, a conical deflector arranged below the bottom of the receptacle and the conical coil and forming a space having outlets at its upper end, and a heater located below the apex of the conical bottom and opposite the space formed at the lower end of said conical deflector.

3. A portable liquid heater comprising a shell, a partition of conical form arranged within the lower portion of the shell and secured at its outer edge thereto forming a receptacle for receiving the liquid to be heated, a false bottom of conical form arranged within said receptacle above the bottom thereof to provide a conical space, refractory material filling said false bottom, a coil of conical form encircling the bottom of the receptacle and in communication at its lower end with the space formed between the bottom of the receptacle and said false bottom, said coil having its upper end extending through the shell and provided with a valve, a conical deflector arranged below the bottom of the receptacle and connected at its upper outer edge to the shell, the latter having openings in its sides opposite the conical space formed between the said deflector and bottom of the receptacle, a support secured to the lower end of the shell, and a lamp mounted upon said support.

In testimony whereof we affix our signatures in presence of two witnesses.

OSCAR P. CHURCHILL.
MAURICE E. RISK.

Witnesses:
W. S. PENDLETON,
E. L. KOGER.